May 2, 1967 J. H. SOUTH 3,317,673

TELEPHONE TRANSMITTED ALARM UNIT USING SELECTOR SWITCHES TO TRANSMIT AND RECEIVE DIAL AND MESSAGE PULSES

Filed March 8, 1963 3 Sheets-Sheet 1

May 2, 1967 J. H. SOUTH 3,317,673

TELEPHONE TRANSMITTED ALARM UNIT USING SELECTOR SWITCHES TO TRANSMIT AND RECEIVE DIAL AND MESSAGE PULSES

Filed March 8, 1963

3 Sheets-Sheet 2

May 2, 1967 J. H. SOUTH 3,317,673

TELEPHONE TRANSMITTED ALARM UNIT USING SELECTOR SWITCHES TO TRANSMIT AND RECEIVE DIAL AND MESSAGE PULSES

Filed March 8, 1963

3 Sheets-Sheet 3

United States Patent Office 3,317,673

Patented May 2, 1967

3,317,673

TELEPHONE TRANSMITTED ALARM UNIT USING SELECTOR SWITCHES TO TRANSMIT AND RECEIVE DIAL AND MESSAGE PULSES

Jack H. South, 10 Williams St., Clarence Park, South Australia, Australia

Filed Mar. 8, 1963, Ser. No. 263,840
Claims priority, application Australia, Mar. 9, 1962, 15,224/62
14 Claims. (Cl. 179—5)

Figure 1:
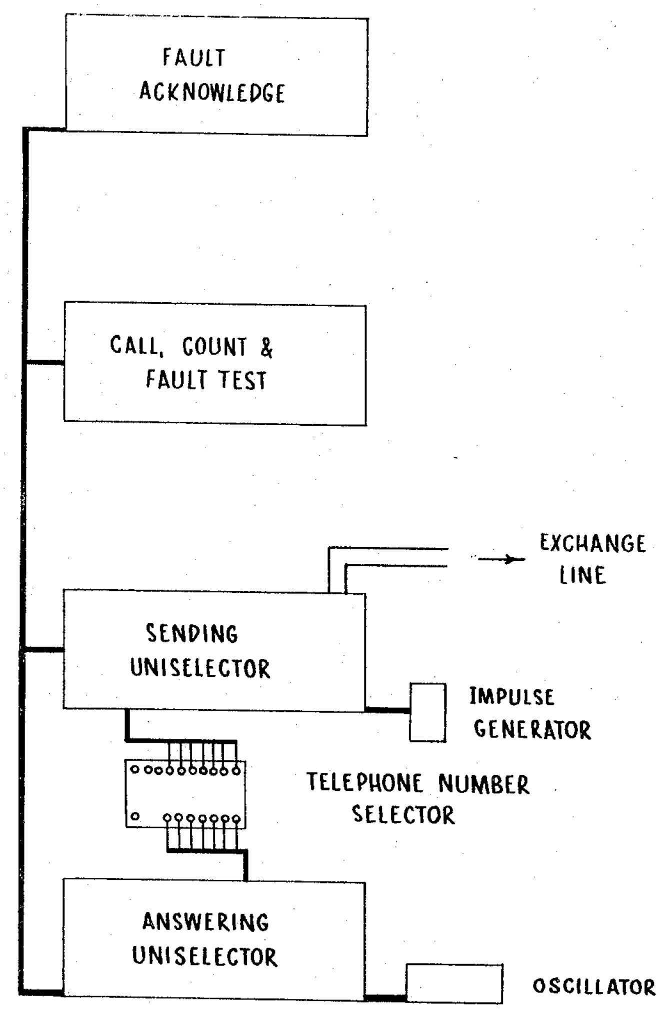

This invention relates to an alarm unit wherein a signal is transmitted by telephone.

It is already well known to sense a set of conditions by electrical means and to transmit a warning signal over a permanently connected telephone line between two points. This arrangement however is unsatisfactory in that it requires a line for the sole purpose of transmitting the alarm, and such a line is expensive to install and maintain.

The main object of this invention is to provide a device wherein a set of conditions can be sensed by a fault circuit and transmitted through a normal telephone channel.

In its simplest form this invention may be said to consist of a telephone transmitted alarm unit wherein a fault acknowledge circuit is coupled to a sending uniselector and an answering uniselector, and a telephone number selector links said sending uniselector to said answering selector, characterized by: a fault circuit including a fault loop and a fault loop relay, audible signal means coupled to said answering and sending uniselectors, and an impulse generator coupled to said sending uniselector.

By this means the sending uniselector can seize a telephone line and energize the impulse generator relay which dials the number which is fixed by the telephone selector links on the telephone number selector between the sending and maintaining uniselector.

When standard telephone lines are employed for automatic transmission of the type defined herein a problem is encountered in that the polarity of a line may inadvertently be reversed, and a further feature of this invention is the sensing of line polarity and changing control of "answered" functions if required. This feature is achieved by the utilizing of a pair of polarity relays each in series with a rectifier, the rectifiers however being reversed relative to each other, and each relay-rectifier network being connected in parallel.

In most practical applications it is desirable that any one of a number of faults may be transmitted and that the receiver should be able to identify the fault, and this feature is achieved in this invention by placing in combination with the audio code transmitting device a driven uniselector switch which is arranged to send an audio signal for each one of a plurality of fault circuit in turn.

In practice it frequency happens that a call is not conveniently answered, and to prevent continuous ringing of the called number, this invention introduces a further feature of a time control means which energizes a driven uniselector switch so that the number is called for a period of time, the call is released if not answered, and the cycle repeats after a further period of time.

As is well known, most telephone systems sometimes call a number which has not been dialled, and to avoid inconvenience in such a case, this invention includes relay and uniselector counting means whereby the unit is locked out of operation after four completely answered calls if a call is not returned to the unit within the required period of time, the uniselector however being connected so that a call into the unit will release the unit to return the unit to its normal operating condition.

With most alarm units, it is desirable that a temporary fault, for example the splashing of water over a floor, should not raise the alarm, and this invention provides means whereby an alarm will not be raised unless the change of state of the fault circuit is continuous for the full period of time required for the device to seize the telephone line and dial the predetermined number.

There are times when an exchange line is faulty, and in order to prevent unnecessary wear on a machine, the invention provides as a further feature, an arrangement of relays, whereby the machine will rest until the exchange line is reinstated.

A still further feature of the invention is that the network includes a slow release relay initiated by lifting a telephone instrument on the alarm unit so that it can be used at all times and take precedence over the automatic transmitting device.

For the purpose of identifying a call to the unit, a repeated vocal message can be transmitted, for example from a tape disc, the vocal message being initiated by the relays and uniselectors in the network. The unit can also be used in conjunction with an audible level indicator.

Still further features and advantages of the invention will become apparent upon consideration of the embodiment thereof which is described in some detail hereunder, and furthermore it will be seen that the invention can be varied widely from the embodiment by the re-arrangement of relays, or the substitution of elements.

Figure 2:
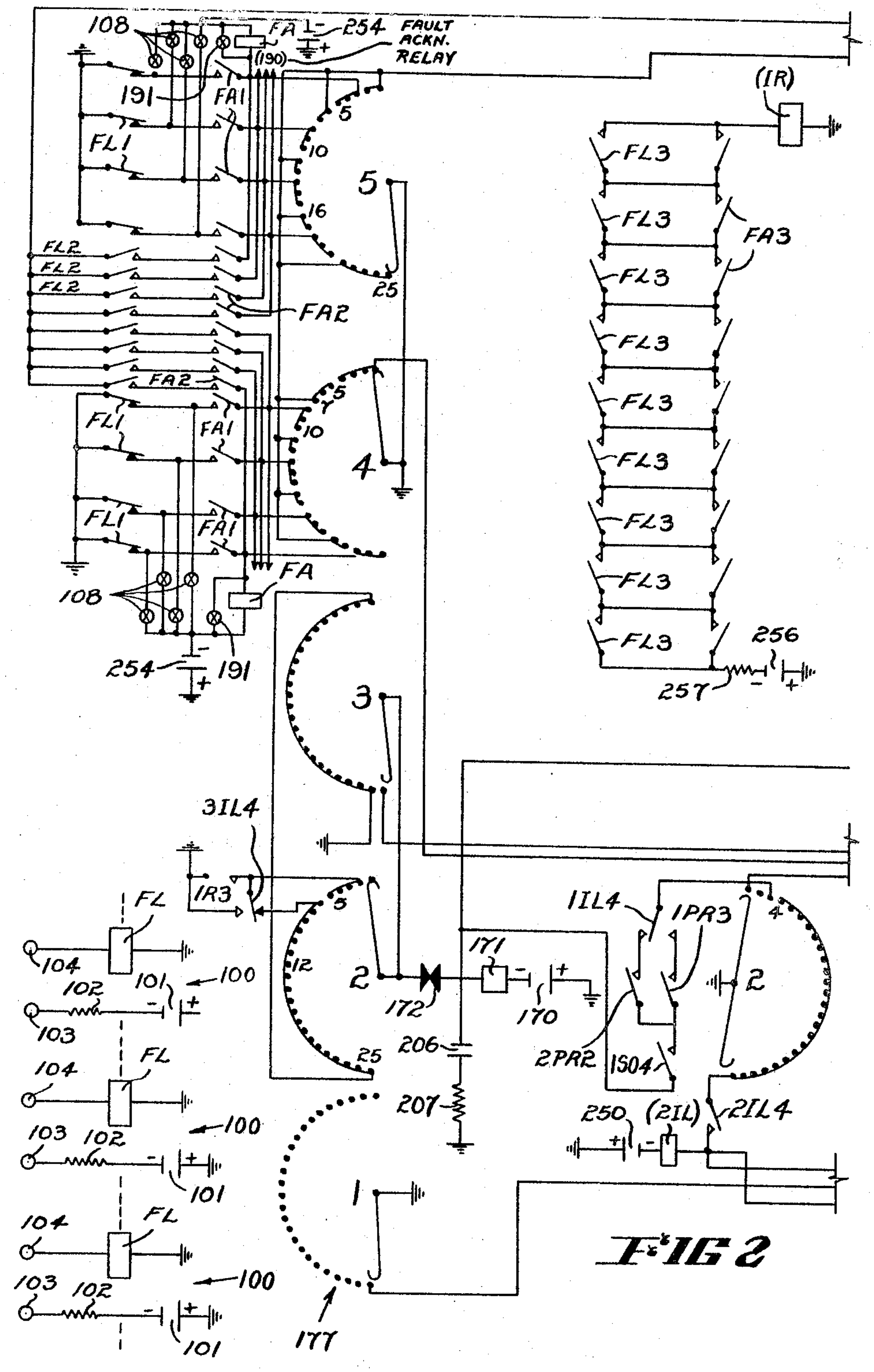
Figure 3:
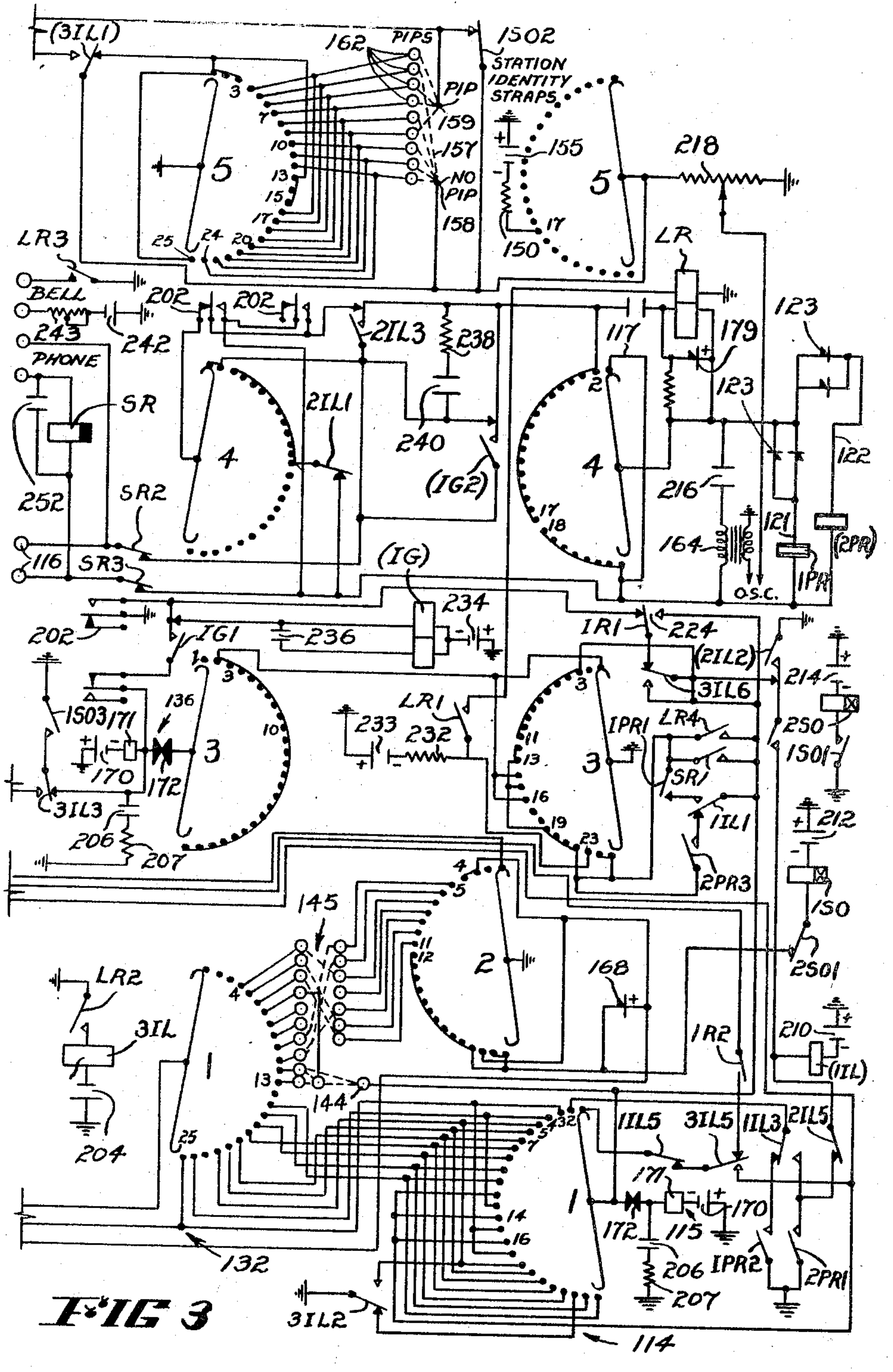

The embodiment described hereunder is described with reference to and is illustrated in the accompanying drawings, in which:

FIG. 1 is a schematic layout of a telephone transmitted alarm unit,

FIG. 2 is a detail of the fault acknowledge and call, count and fault test circuits, and FIG. 3 is a detail of the sending and answering uniselectors, impulse generator and telephone number selector circuits, According to this embodiment a series of eight fault circuits 100 each consists of a battery 101, a resistor 102 in series with the battery 101, a fault loop (not shown) between terminals 103 and 104, and a fault relay FL, the fault loop relay FL normally being energized but becoming de-energized upon the opening of the circuit in the fault loop.

When a fault loop is open circuited, a fault loop relay FL containing three contacts becomes de-energized. One of the contacts FL1 on the fault loop relay FL which is normally closed returns to its normal condition and simply energizes a fault lamp 108 (one for each relay) on the device so that the fault can be identified. The fault loop relay also carries the contacts FL2 thereon. A third contact FL3 on the fault relay FL which is normally open returns to its normal position and releases an initiating relay IR. Contacts IR1 of the initiating relay IR change position to permit drive of a five bank first uniselector switch 114 to its number 2 contact position by completing the drive circuit 115 thereof. In the number 2 contact position, bank 4 of the first uniselector 114 loops the telephone exchange line 116, removes a shunt connection 117 from a pair of polarity relays 1PR and 2PR, and shunts a line relay LR. The polarity relays 1PR and 2PR are however each in a parallel circuit comprising branches 121 and 122 respectively, and each branch includes a pair of rectifiers 123, the rectifiers 123 being reversed in direction so that the circuit is completed even if there is a reversed polarity on the line.

The loop on the exchange line 116 is then maintained by bank 4 of the first uniselector 114, and is retained in its maintained position for about three quarters of the traverse of the contacts (to contact 17) on that first uniselector 114.

If the first polarity relay 1PR operates, the uniselector 114 is driven on to contact 3, while if the second polarity relay 2PR operates, the original operational circuit of the first uniselector 114 is broken so as to check that the first interlock relay 1IL is normal before repeat attempts at calling are made.

When the first uniselector 114 is in the position of contact 3, bank 2 thereof energizes a second five contact interlock relay 2IL, bank 3 thereof energizes an impulse generator relay IG for the dialling of the predetermined number (this impulse relay being double wound). A contact 2IL1 on the second five contact interlock relay 2IL breaks the circuit of bank 4 of the second uniselector switch 132, thereby preventing "zero loop" during predialling pause while the second uniselector 132 carries out the timing functions in association with the first uniselector 114; a further contact 2IL2 on the second five contact interlock relay 2IL holds the first five contact relay 1IL if it is operative; the set of contacts IG1 on the impulse generator relay IG close to allow operation of the driving mechanism 136 for the second uniselector switch 132. Should this be interrupted the circuit of the impulse generator relay IG is interrupted by the first uniselector 114, and repeats at the rate of ten times per second and has a "make" ratio of thirty three percent in relation to a second pair of contacts on the impulse generator relay IG, the self-interruption of contact IG1 on the impulse generator relay IG stepping of the second uniselector 132, and continuing until the complete number to be called has been sent to the telephone exchange to which it is connected.

The pre-dialling pause and counting of impulses sent to the exchange is effected in the following manner:

When the second uniselector bank 132 reaches the position of contact 25, a circuit is completed through contact 25 of bank 1 of the uniselector 132 which drives the first uniselector 114 to the position of contact 4, then the second uniselector 132 continues to rotate until it reaches the position of contact 24 whereupon a further circuit is completed through contact 24 of bank 1 which similarly drives the first uniselector to position 5, and during this continued sequence of operations, a bank 2 on the second uniselector 132 (together with uniselector 114) holds the second five contact interlock relay 2IL in its energized condition. When eventually the second uniselector 132 reaches the position of contact 1, the bank 2 on the second uniselector 132 releases the second five contact interlock relay 2IL, and the bank 4 on the second uniselector 132 maintains a shunt circuit for the second contacts IG2 on the impulse generator IG through contacts 2IL3 on the second five contact interlock relay 2IL, while contacts 2IL2 on the second five contact interlock relay 2IL changes the locking circuit of the first five contact interlock relay 1IL if it is then operative. When the second uniselector 132 reaches the position of contacts 3, bank 4 thereof gives a zero impulsing loop on the exchange line 116, so that each operation of contact IG2 on the impulse generator IG breaks the exchange line circuit, and the impulses will continue until such time as the second five contact interlock relay 2IL re-operates.

During the traverse of the second uniselector 132 from contacts 4 to 13, while the first uniselector 114 is at the position of contact 5, when the wiper on bank 1 of the second uniselector 132 is connected with a required digit of the predetermined number to be called, the second five contact interlock relay 2IL operates, the contact 2IL of this relay 2IL locks it in, the contact 2IL1 breaks the "zero loop," the third contact 2IL3 shunts the second contact IG2 of the impulse generator IG and prevents further impulsing to exchange, and the second contact 2IL2 maintains a locking circuit of the first interlock relay 1IL if that relay is then operative.

When the second uniselector 132 reaches contact 21, it drives the first uniselector 114 to position 6 as before, and when the second uniselector 132 again reaches position 1, the second five contact interlock relay 2IL is again released.

In this manner the impulse generating and second interlock relays continue to transmit impulses to the exchange until the complete number to be called has been sent to the exchange.

If less than seven trains of impulses are required the train corresponding to those not required is strapped to a common terminal 144 on the telephone number selector 145 and the first uniselector drives to position 12.

When the first uniselector 114 has reached the position of contact 12, its bank 2 contacts complete a circuit which holds the second five contact interlock relay 2IL via rectifier 168 and operates a four contact slow operate relay 1SO, which in turn operates a single contact slow operate relay 2SO, and further drives the second uniselector 132. The contacts 2SO1 of single contact relay 2SO then open and release the four contact relay 1SO, the contacts 1SO1 of which in turn open and release the single contact relay 2SO and the second uniselector 132 steps to next position.

This inter-action of the slow operating relays continues at approximately one operation of each relay per second. The second uniselector 132 steps under their control and drives the first uniselector 114 until the first uniselector 114 reaches the position of contact 1.

The only exceptions to this are when the first uniselector 114 is in positions 14, 16 and 23. When the second uniselector 132 reaches the position of contact 1, the first uniselector 114 drives to the position of contact 13, when the second uniselector 132 reaches the position of contact 24, the first uniselector drives 114 to the position of contact 14, the second drives to the position of contact 1 and the first to the position of contact 15. This enables interconnection of second uniselector 132 (16–25) and first uniselector 114 to be used for subsequent timing functions, and also enables connection of audio device (uniselector 114 bank 5 contact 17 to 15) if required where reversal from exchange does not occur. When the second reaches the position of contact 25, the first drives to the position of contact 16, the second drives to the position of contact 1 and this drives first to the position of contact 17, as for the position of contact 16 above. Bank 5 of the first uniselector 114 completes a battery circuit 150 for an oscillator (not shown), but the battery circuit is shunted to earth via contact 3IL1 of a six contact interlock relay 3IL, and bank 5 of the uniselector 132.

When the second uniselector 132 reaches position 4, the control of the shunt on the oscillator battery 155 is either maintained by a bridge 157 between a "no pip" terminal 158 and a "pip" terminal 159 or is controlled by a contact 1SO2 of the four contact relay 1SO if the "pip" terminal 159 is strapped to one or more of the "pips" terminals 162 linked to bank 5 of the uniselector 132. This arrangement gives audible signals of short duration which are fed to the exchange by the transformer 164 on the oscillator, the transformer 164 being in parallel with the polarity relays 1PR and 2PR. These audible signals continue as the second uniselector 132 steps to position 13. When the second uniselector 132 is in the positions of contacts 13, 14 and 15, these contacts on its fifth bank shunt the oscillator via the contacts 3IL1 of the six contact interlock relay 3IL. This gives a pause of three seconds before station identification is repeated. The second uniselector 132 in positions of contacts 16 to 24 inclusive allows station identification to be repeated as for positions 4 to 13.

When however the second uniselector 132 reaches position of contact 25, the first uniselector 114 drives from position 17 to position 18, and contacts on its fourth bank disconnect the loop on the exchange line, remove the shunt on the line relay LR, and shunt the two polarity relays 1PR and 2PR. The fifth bank on the first uniselector 114 disconnects the battery 155 from the oscillator. The second uniselector 132 continues to drive the first uniselector 114 in a similar manner already described until the first uniselector 114 reaches position 23. The second bank of the first uniselector 114 then breaks the circuit for the four contact relay 1SO and holds the second five contact interlock relay 2IL. The first bank of the first uniselector 114 drives the uniselector 114 to position 24, while the circuit of the second bank of uniselector 114 for the four contact relay 1SO and the second five contact interlock relay 2IL reverts to its previous condition and the four contact relay 1SO and single contact relay 2SO then pulse.

When the second uniselector 132 again reaches position 17, the first uniselector 114 then drives to the position of contacts 25, and the second uniselector 132 continues to step and drives the first uniselector 114 to position 1.

The unit then makes another call as previously described. It continues to call until it is either acknowledged by an incoming call or has been answered four times. These conditions are described hereunder:

When a call is answered the first uniselector 114 is in any of the positions of contacts 12 to 17. One of the polarity relays 1PR or 2PR will operate to reversal on the exchange line. This depends on which one operated on position 2 of the first uniselector. The one which operated on this position now releases but has no function.

If the first polarity relay 1PR operates, the first uniselector 114 in either position 12 or 13 is driven by a contact of the first polarity relay to position 14. (The circuit is from battery 170, through drive magnet 171, interruptor 172, contact 1IL1 of relay 1IL, contact 1PR1 of relay 1PR, bank 3 uniselector 114 to earth.) With the first uniselector 114 in position 14 the conditions are as for an unanswered call previously described, and the first uniselector 114 drives to position 15. If either of the polarity relays 1PR or 2PR operate when the first uniselector 114 is on position 15, it then drives to position 16, in like manner to the way it was driven to positions 12 to 13.

If the first uniselector 114 is in position 16 the conditions are the same as for position 14 and the first uniselector 114 then drives to position 17 while the second uniselector 132 drives to position 1.

The first uniselector 114 is of course the answering uniselector and the second uniselector 132 the sending uniselector. The circuit however includes a third uniselector 177.

With the first uniselector 114 in position 17 (that is its message position) the second uniselector 132 steps to position 3 as before from position 1, With the second uniselector 132 in position 3, a third uniselector 177 steps to its next position, this constituting a "call count" feature. If the third uniselector 177 steps four times the original operating earth is removed from the first uniselector 114 position 1 and the unit cannot originate any further calls unless the third uniselector 177 is restored to its position 1 by an incoming call or clearing of the fault. Station identification is given as before. The first uniselector 114 drives to position 18.

Functions of the unit from position 18 on are identical with an unanswered call. Release of either the polarity relays produces no function.

An incoming call, either "acknowledge" or "check" is accepted at any time the exchange line is not looped. The term "acknowledge" refers to acceptance by the unit of an incoming call as confirmation that the call it has made (after a fault call has been transmitted and answered) has been received by the correct party, and the unit does not transmit further calls in respect of faults existing at this time. The term "check" refers to interrogation of the unit to ascertain condition of fault circuits and may be made from any telephone. This may be either routine checking of condition of fault circuits or checking to see if a previously reported fault has been cleared. An acknowledged call is normally received when the first uniselector 114 is on position 18 to 25. If the third uniselector 177 is on position 5 the acknowledged call may be received with the first uniselector 114 on position 1 in the same manner as a check call. With the first uniselector 114 on position 18, the line relay LR operates to the ring current from the exchange. A rectifier 179 bridging the line relay LR (which is double wound) makes the line relay LR slow to release and bypasses every other half cycle of ring current. This allows the line relay LR to operate and hold to the alternating component of the ring from the exchange. A contact LR1 on the line relay LR locks the line relay LR in, another contact LR2 operates the six contact interlock relay 3IL, a further contact LR3 rings the station bell (not shown), the second contact 3IL2 of the six contact relay 3IL drives the first uniselector 114 to position 19, the third contact 3IL3 of the six contact interlock relay 3IL changes the contact of the four contact relay 1SO stepping the earth connection from the second uniselector 132 to the third uniselector 177, while a fourth contact 3IL4 on the six contact interlock relay 3IL drives the third uniselector 177 from any of positions 2 to 5 to position 6 thereby cancelling the "call count, wherein count of four effective calls is automatically cancelled if all "unacknowledged" calls faults clear or if the unit receives an incoming (check or acknowledge) call.

With the first uniselector 114 in any positions 19 to 22, the operation for an incoming call on any of these steps is the same as it would have been if the first uniselector 114 had been driven to its position 19 by the six contact interlock relay 3IL. Then a contact LR4 of the line relay LR drives the first uniselector 114 to position 23, contacts on the second bank of the first uniselector 114 break the circuit of the four contact relay 1S0 and hold the second five contact interlock relay 2IL. This stops the pulsing of the four contact relay 1SO and single contact relay 2S0 and thus stops the third uniselector 177 from stepping. The contacts on the third bank of the first uniselector 114 release the line relay LR during "silent" period of an incoming ring. The contact LR2 of the line relay LR releases the six contact interlock relay 3IL while the contact LR3 of the line relay LR stops the station bell. The second contact 3IL2 of the six contact interlock relay 3IL drives the first uniselector 114 to position 24, and the second bank of contacts on the first uniselector 114 start the four contact relay 1S0 and single contact relay 2SO pulsing as before. This steps the second uniselector 132.

Then the first uniselector 114 is driven either to position 25 by the second uniselector 132, or to position 1 by the second contact LR3 of the line relay LR. This depends on the re-operation of the line relay LR to ring on exchange line or the second uniselector 132 reaching position 17 whichever occurs first.

The line relay LR is operated either while the first uniselector 114 is on position 24 or operates while the first uniselector 114 is on position 25. The first contact LR1 of the line relay LR locks the line relay LR as before, the contact LR2 operates the six contact interlock relay 3IL as before, and the contact LR3 rings a bell as before.

With the first uniselector 114 in position 1, its third bank homes the second uniselector 132 to position 1. The fifth contact 3IL5 of the six contact interlock relay 3IL and the second bank of the second uniselector 132 then drives the first uniselector 114 to position 2. The fourth bank of the first uniselector 114 then loops the exchange line as for an outgoing call, places a shunt across the operating winding of the line relay LR and removes the shunt from the polarity relays 1PR and 2PR. The exchange line 116 is tested and the first uniselector 114 steps to position 3 as for an outgoing call. The second bank on the first uniselector 114 then operates the second five contact interlock relay 2IL. The third bank drives the first uniselector 114 to position 17 via three different circuits: the first uniselector bank position 3 to 11 through one circuit, position 12, 13, 15 through a second circuit and position 14 and 16 through a third circuit.

With the first uniselector 114 on position 12 the circuit is completed for the 1SO and 2SO relay pulsing circuit and the second five contact interlock relay 2IL re-operates. During the driving of the first uniselector 114 from position 5 to 11, the second five contact interlock relay 2IL is released and the loop on the exchange line 116 is maintained.

With the first uniselector 114 on position 17, the third uniselector 177 steps under control of the third contact 2SO3 of the four contact relay 2SO. For a check call, the third uniselector 177 must step from position 1 before it drives to position 6 via the fourth contact 3IL4 of the six contact interlock relay 3IL.

With the third uniselector 177 on positions 8 to 10, the shunt on the oscillator battery 155 is removed and a continuous audible signal is fed to the exchange line 116 for a period of three seconds. This indicates a "fault." The first fault acknowledge relay FA operates and a fault acknowledge lamp 191 lights by closure of contacts FA1, the second contacts FA2 on the first acknowledge fault relay FA locks the fault acknowledge relay FA, the third contact FA3 operates the initiating relay IR.

With the third uniselector 177 in position 11 to 12 the same conditions apply as when it is in position 6 to 7.

With the third uniselector 177 in position 13 to 15, the second fault acknowledge relay (also designated FA) operates in a manner similar to the first fault acknowledge relay FA on steps 8 to 10. The shunt on the oscillator battery 155 is via the fourth bank of the third uniselector 177, the first contact FA1 of the second fault acknowledge relay, the first contact FA2 of a fault loop relay FL, and the second contact 1SO1 of the four contact relay 1SO. This gives three successive audible signals ("pips") to the exchange line and indicates "all clear."

With the third uniselector 177 on position 16 to 17, the second fault acknowledge relay FA releases and the fourth bank of the third uniselector 177 shunts the oscillator battery 155.

The testing of faults continues in this manner until the fourth fault has been tested when the control of the shunt on the oscillator battery 155 is transferred to the fifth bank of the third uniselector 177 as the third uniselector 177 reaches position 1 and the wipers are single ended. When all faults have been tested (up to eight in this embodiment) the third bank of the third uniselector 177 drives the third uniselector 177 to position 25.

The first bank of the third uniselector 177 drives the first uniselector 114 to position 18; the fourth bank of the first uniselector 114 disconnects the loop from the exchange line 116 as before; the second contact 3IL2 of the six contact interlock relay 3IL drives the first uniselector 114 to position 19; the second contact LR3 of the line relay LR drives the first uniselector 114 to position 23; the second bank of the first uniselector 114 stops the four and single contact relays 1SO and 2SO from pulsing and holds the second five contact interlock relay 2IL; the third bank of the first uniselector 114 releases the line relay LR; the first contact LR1 of the line relay LR opens the locking circuit of the line relay LR; the contact LR2 releases the six contact interlock relay 3IL; the contact LR3 stops the station bell; the second contact 3IL2 of the six contact interlock relay 3IL drives the first uniselector 114 to position 24 (as before); the third contact 3IL3 of the six contact interlock relay 3IL prepares a step for the second uniselector 132 under the control of the third contact 1SO3 of the four contact relay 1SO; the second uniselector 132 steps under the control of the third contact 1SO3 of the four contact relay 1SO until it reaches position 17 where it drives the first uniselector 114 to position 25; the second uniselector 132 continues to step until it reaches position 16 when it drives the first uniselector 114 to position 1; the second bank of the first uniselector 114 drives the third uniselector 177 to position 1; and the third bank of the first uniselector 114 drives the second uniselector 132 to position 1 as before. The unit is now ready to accept further fault and test calls.

A slow release relay SR is positioned so that lifting of the hand set of the station phone operates the relay connecting the phone to the exchange line. The first contact SR1 on the relay SR has no function unless the first uniselector 114 is off normal when it assists in the homing of the first uniselector 114, and the second contact SR2 and third contact SR3 of this slow release relay SR disconnects the unit from the exchange line.

During setting up of fault call, a fault can be cleared at this time when the first uniselector 114 is driven to position 12 and no further impulsing occurs. The unit holds the exchange line and then releases it as for a call that is not anwsered. It then restores to normal by stepping the second and first uniselectors as described for an unanswered call.

For the purpose of testing the impulse circuit, a series of switches or keys 202 are used, the first giving a zero loop on the exchange line 116, the second feeding impulses from the second contact IG2 of the impulse generator to the exchange line 116, the third completing the self-interruption circuit of the impulse generator IG and the fourth breaking the circuit of the second uniselector 132 to prevent it from stepping. This permits the speed and ratio of the impulse generator IG to be tested by the exchange to which the unit is connected.

The above embodiment has been described with reference to an oscillator tone. However, a vocal message can be used in lieu of, or as well as, the oscillator tone. In such a case the vocal recording device (for example tape-recorder) is linked to any or all of contacts 15, 16 and 17 of bank 3 of the first (answering) uniselector 114. The vocal message is transmitted to exchange line 116 through transformer 164 as before.

The following is a brief summary of the remaining elements of FIGS. 2 and 3:

Battery 204 energizes the six contact relay 3IL upon closure of contacts LR2 (of line relay LR).

Each driving mechanism for the uniselectors includes a battery 170, a driving magnet 171, a drive magnet 172, and a timing circuit comprising a capacitor 206 and resistor 207.

The battery 210 energizes the first five contact interlock relay 1IL.

The battery 212 energizes the four contact relay 1SO.

The battery 214 energizes the single contact relay 2SO.

The capacitor 216 couples the audio signal from the oscillator to bank 4 of the first uniselector 114.

The resistor 218 is a voltage divider for feeding the oscillator.

The contacts 3IL5 are on the six contact interlock relay 3IL and is included in the circuit for the driving of the first uniselector 114 to its position 2 (the circuit then being battery 170, drive magnet 171, interruptor 172, contacts 1IL5, contacts IR1, bank 4 of uniselector 177 to earth).

The contacts 1IL5 are on the five contact interlock relay 1IL.

The contacts IR1 are on the initiating relay IR.

The contacts 1IL3 are on the first five contact interlock relay 1IL and form part of the drive circuit for uniselector 114 (the circuit then being battery 170, drive magnet 171, interruptor 172, contacts 1IL3, contacts 2PR1, earth).

The contacts 2PR1 are on the second polarity relay 2PR.

Alternative contacts 1PR2 are on the first polarity relay 1PR.

Resistor 232 is in a locking circuit for locking line relay LR in the case of an incoming call, but prevent short circuiting of battery 233 through bank 3 (position 23) of uniselector 114.

Battery 234 energizes the impulse generator IG, while capacitor 236 provides the time constant means therefor.

Resistor 238 and capacitor 240 constitute a time delay circuit on the exchange line 116.

Battery 242 and resistor 243 provide the required bell operating voltage and power.

The network of contacts 1SO4 (on four contact relay 1SO), 2PR2 (on polarity relay 2PR), 1PR3 (on polarity relay 1PR), and 1IL4 (on five contact interlock relay 1IL), give the required interlock between the sending uniselector and the call, count and fault test circuit.

The battery 250 provides the required power for the second five contact interlock relay 127.

The capacitor 252 constitutes time delay means for the slow release relay SR.

Batteries 254 provides power for energizing lamps 108 and 191, and relay FA.

Battery 256 and resistor 257 provide power for relay IR.

Contact 2IL5 is an interlock contact on relay 2IL.

Contact 3IL6 is an interlock contact on relay 3IL.

Contact 2PR3 is on relay 2PR.

The following is a schedule of circuits for some of the main stages of operation mentioned in the above embodiment:

(A) Fault loop open circuited, relay FL de-energized: 101, 102, open between 103 and 104, FL earth.

(B) Fault lamp energized: 254, 108, FL1, earth.

(C) Release relay IR: 256, 257, FL3, IR, earth.

(D) Drive 114: 170, 115, 172, 114 bank 1, 1IL5, 3IL5, IR2, 177 bank 4, earth.

(E) Loop 116, remove shunt 117, and shunt LR: 116, SR3; either 1PR, 121, 123 or 2PR, 121, 123; 114 bank 4 position 2, 2IL3, 202, 132 bank 4 position 1, SR2, 116.

(F) If 1PR operates, 114 driven to position 3: 170, 171, 172, 114 bank 1 position 2, 1IL3, 1PR2, earth.

(G) If 2PR operates, 114 driven to position 3: (a) 1IL energized: 210, 1IL, 2IL5, 2PR1, earth 1IL5 open circuit, and 1IL3 changes position, then (b) 170, 115, 172, 114 bank 1 position 2, 1IL4, 2PR1, earth.

(H) 2IL energized by 114 on position 3: 250, 2IL, 114 bank 2 position 3, earth.

(I) IG energized by 114 on position 3: 234, IG, IR1, 3IL6, 114 bank 3 position 3, earth.

(J) Predialling pause and counting of impulses effected: (a) with 132 on position 25, 114 driven to position 4: 170, 115, 172, 114 bank 1 position 3, 132 bank 1 position 25, 2IL4, 132 bank 2 position 25, earth, (b) with 132 on position 24, 114 driven to position 5 (as above), (c) when 132 reaches position 3, 132 bank 4 gives zero impulsing loop on 116: 116, SR3, 2IL1, 132 bank 4 position 3, 202, 2IL3, IG2, SR2, 116.

(K) Selection of telephone number by sending uniselector: (a) 2IL operates: 250, 2IL, 132 bank 1 position 4–13, 145, 114 bank 2 position 5–11 corresponding with position on 132 bank 1, earth, (b) 2IL locked by 2IL4: 250, 2IL, 2IL4, 132 bank 2 position 4–25, earth, (c) 2IL1 opens and breaks "zero loop," (d) 2IL3 closes and shunts IG and prevents further impulsing to exchange. 114 and 132 continue to transmit impulses to exchange until number is called.

(L) Station identification: 132 bank 5 positions 4–13 and 16–24; control of shunt on oscillator is either maintained by strap 157 or controlled by ISO2 if 159 strapped to selected terminals 162.

(M) Unit continues to call until acknowledged by incoming call: (a) call answered when 114 in positions 12–17:

Whichever of relays 1PR and 2PR which first operated when 114 on position 2 releases, and the other relay operates on reversal on exchange line 116.

If 1PR operates when 114 in position 12 or 13, 1PR1 drives 114 to position 14 (170, 171, 172, 1IL1, 1PR1, 114 bank 3 position 12–13, earth). Similarly if 1PR operates, through relay 2PR3 114 drives to position 17 as before, and 132 drives to position 1 as before. With 114 on position 17, 132 steps to positions to complete circuit through 1SO3 to earth as before.

(N) With 132 position 3, 177 steps to next position (170, 171, 1SO4, 2PR2, or 1PR3, 1IL4, 132 bank 2 position 3, earth). If 177 steps four times, original earth on 177 bank 4 is removed from 114 position 1 and unit cannot originate further calls unless 177 restored to position 1 by incoming call or clearing of fault.

(O) Incoming call: 179 makes LR slow to operate and thereby hold to alternating ring from exchange. LR1 locks LR (233, 232, LR1, LR, earth) LR2 operates 3IL (204, 3IL, LR2, earth) LR3 rings station bell (242, 243, bell, LR3, earth) 3IL2 drives 114 to position 19 (170, 171, 172, 114 bank 1 position 18, 3IL2, earth) 3IL3 changes 1SO3 stepping earth from 132 to 177 3IL4 drives 177 from position 2–5 to position 6 (170, 171, 172, 177 bank 2 positions 2–5, 3IL4, earth). This cancels "call count."

(P) Audio fault signal transmission: With 114 on position 17, 177 steps from position 1 to position 6. With 177 on position 6 or 7, 155 is shunted through 150, 114 bank 5 position 17, 3IL1, 177 bank 4 position 6 or 7, earth. With 177 on positions 8–10, shunt on 155 removed and tone fed to 116 for three seconds indicating "fault." Appropriate relay FA operates and 191 lights (254, FA and 191, 177 bank 4 positions 8–10, earth). Contacts FA2 lock FA (254, FA and 191, FA2, FL1 earth) FA3 operates IR (256, 257, FL3—FL3, FA3, IR, earth) 177 positions 11–12 as for 6–7, 177 positions 13–15. An alternative LR4–191–254 circuit operates as before.

What I claim is:

1. Telephone transmitted alarm unit wherein a fault acknowledge circuit is coupled to a sending uniselector and an answering uniselector, and a telephone number selector links said sending uniselector to said answering selector, characterized by:

a fault circuit including a fault loop and a fault loop relay, audible signal means coupled to said answering and sending uniselectors, and an impulse generator coupled to said sending uniselector.

2. Telephone transmitted alarm unit according to claim 1 further characterized by:

a fault circuit including a fault loop and a fault loop relay, a fault acknowledge circuit linked to contacts of said fault loop relay, and an initiating means including an initiating relay interlocked with said fault loop and fault acknowledge relays to change position upon change of circuit condition of said fault loop, contacts on said initiating means initiating drive of said answering uniselector upon de-energizing of said initiating relay.

3. Telephone transmitted alarm unit according to claim 1 further characterized by:

a plurality of fault circuits each including a fault loop and a fault loop relay, a plurality of fault acknowledge circuits linked to contacts one on each fault loop relay, and an initiating means including an initiating relay interlocked with said fault loop and fault acknowledge relays to change position upon open circuit of any one of said fault loops, contacts on said initiating means closing a drive circuit of said answering uniselector upon de-energizing of said initiating relay.

4. Telephone transmitted alarm unit according to claim 1 further characterized by:
exchange line polarity sensing means,
said sensing means comprising a pair of parallel circuits each including a polarity relay and a rectifier, the direction of said rectifiers being reversed in relation to each other.

5. Telephone transmitted alarm unit according to claim 1 further characterized by:
said audible signal means comprising an oscillator normally connected to the exchange line, and audible signal interruption means in a circuit including selectable contacts on a said uniselector.

6. Telephone transmitted alarm unit according to claim 1 further characterized by:
said audible signal means comprising an oscillator connected to the exchange line,
a shunt across the power supply of said oscillator rendering said oscillator inoperative during periods of traverse by a said uniselector past selectable contacts on said sending uniselector.

7. Telephone transmitted alarm unit according to claim 1 further characterized by:
said audible signal means comprising an oscillator connected to the exchange line, a pulsing contact connected to the oscillator and constituting oscillator interruption means whereby a series of short audible signals is normally transmitted to said exchange line, said pulsing contact being in a circuit including a fault loop relay contact.

8. Telephone transmitted alarm unit according to claim 1 further characterized by:
a plurality of fault circuits each including a fault loop and a fault loop relay,
a plurality of fault acknowledge relay circuits linked to contacts one on each fault loop relay,
said audible signal means comprising an oscillator and a battery driving said oscillator, the connection between said battery and said oscillator passing through a contact on said answering uniselector,
a third uniselector,
a pulsing shunt across said battery including a pulsing contact and traversed by said third uniselector whereby said oscillator normally transmits a series of short audible signals to the exchange line during portion of traverse of said third uniselector, said shunt including portion of each fault and fault acknowledge relay circuit, whereby said oscillator transmits a continuous audible signal to the exchange line over portion of traverse of said third uniselector upon opening of the shunt by operation of any one of said fault relay circuits,
further portion of said traverse of said third uniselector completing an alternative shunt circuit thereby silencing said audio signal.

9. Telephone transmitted alarm unit according to claim 1 further characterized by:
a third uniselector,
a series of successive bridges between successive contacts on the sending uniselector and successive contacts on said answering uniselector, said successive bridges each forming portion of the drive circuit of said answering uniselector,
impulse generator means forming portion of the drive circuit of said sending uniselector,
a connection between a contact on said sending uniselector and the drive magnet of said third uniselector forming part of the drive circuit of said third uniselector when said sending uniselector traverses said sending uniselector contact, said connection including a contact on a relay linked to said answering uniselector to be closed once in each traverse thereof, the circuit of said answering uniselector passing through a series of adjacent contacts on said third uniselector, whereby
said impulse generator means drive said sending uniselector, said sending uniselector drives said answering uniselector one position for each traverse of said sending uniselector, and said sending uniselector drives said third uniselector once in each traverse of said answering uniselector until said third uniselector traverses said series of adjacent contacts thereon.

10. Telephone transmitted alarm unit according to claim 1 further characterized by:
a third uniselector,
a plurality of fault circuits each including a fault loop and a fault loop relay,
a plurality of fault acknowledge circuits linked to contacts one on each fault loop relay,
an initiating relay interlocked with the contacts of said fault loop and fault acknowledge relays to be deenergized upon open circuit of any one of said fault loops, contacts on said initiating relay closing a drive circuit on said answering uniselector through a series of successive contacts on said third uniselector,
a series of successive bridges between successive contacts on said sending uniselector and successive contacts on said answering uniselector, said successive bridges each forming portion of the drive circuit of said answering uniselector,
an impulse generator forming portion of the drive circuit of said sending uniselector,
a connection between a contact on said sending uniselector and the drive magnet of said third uniselector forming part of the drive circuit of said third uniselector when said sending uniselector traverses said sending uniselector contact, said connection including a contact on a relay linked to said answering uniselector to be closed once in each traverse thereof, whereby
said impulse generator drives said sending uniselector, said sending uniselector drives said answering uniselector one position for each traverse of said sending uniselector, and said sending uniselector drives said third uniselector once in each traverse of said answering uniselector until said third uniselector traverses said series of successive contacts thereon.

11. Telephone transmitted alarm unit according to claim 1 further characterized by:
a line relay connected to the exchange line through a plurality of interlock relays,
a half wave rectifier across a coil on said line relay, and contacts operated by said line relay controlling the drive circuits of each of said uniselectors.

12. Telephone transmitted alarm unit according to claim 1 further characterized by:
a slow release telephone precedence relay between the exchange line and telephone terminals, and
interlock contacts on said telephone precedence relay disposed in an alternative drive circuit of said answering uniselector, said drive circuit of said answering uniselector also including contacts thereof, whereby
upon closure of said telephone precedence relay interlock contacts, said answering uniselector drives to a normal position.

13. Telephone transmitted alarm unit according to claim 1 further characterized by:
a plurality of fault circuits each including a fault loop and a fault loop relay,
a plurality of fault acknowledge relays,
a normally open contact on each said fault acknowledge relay in the coil circuit thereof, connected in series with a normally closed contact on said fault relay,
a series of normally open contacts one on each of said fault loop relays, a series of normally open contacts one on each of said fault acknowledge relays, each fault loop contact of first said series being in parallel with a corresponding fault acknowledge contact of second said series, said contacts forming portion of the energizing circuit of said initiating relay, whereby said telephone transmitted alarm unit is responsive to faults subsequent to previously acknowledged faults.

14. Telephone transmitted alarm unit according to claim 1 further characterized by:

a third uniselector, a line relay connected to the exchange line through a plurality of interlock relays, a change over contact on said line relay, said change over contact being alternatively in the drive circuit of said sending uniselector and said third uniselector, whereby said third uniselector transmits only signals through said fault circuit upon energizing of said line relay, and said sending uniselector is rendered inoperative.

References Cited by the Examiner

UNITED STATES PATENTS 2,768,238 10/1956 Risinger -------------- 179—5

DAVID G. REDINBAUGH, *Primary Examiner.*

J. T. STRATMAN, *Assistant Examiner.*